United States Patent [19]

Genga

[11] Patent Number: 5,443,207
[45] Date of Patent: Aug. 22, 1995

[54] INTEGRATED ZONING CIRCULATOR

[75] Inventor: Richard A. Genga, East Greenwich, R.I.

[73] Assignee: Taco, Inc., Cranston, R.I.

[21] Appl. No.: 91,214

[22] Filed: Jul. 13, 1993

[51] Int. Cl.⁶ .............................................. F24D 3/00
[52] U.S. Cl. .................... 237/8 R; 237/8 C
[58] Field of Search ............ 237/8 R, 8 C; 236/9 A

[56] References Cited

U.S. PATENT DOCUMENTS

| | | | |
|---|---|---|---|
| 2,073,676 | 3/1937 | Broderick | 236/9 |
| 2,375,870 | 5/1945 | Ray | 237/8 |
| 2,455,039 | 11/1948 | Broderick | 237/8 |
| 2,530,581 | 11/1950 | Markis et al. | 237/8 |
| 3,329,343 | 7/1967 | Geaslen et al. | 237/8 |
| 3,974,427 | 8/1976 | Carson | 236/1 |
| 4,106,692 | 8/1978 | Baier | 237/8 R |
| 4,192,455 | 3/1980 | Rasmussen et al. | 237/8 R |
| 4,335,848 | 6/1982 | Eidejus | 237/8 R |
| 4,497,438 | 2/1985 | Bonne | 237/8 R |
| 4,629,116 | 12/1986 | Laing et al. | 237/8 R |

Primary Examiner—Henry A. Bennet
Attorney, Agent, or Firm—Fish & Richardson

[57] ABSTRACT

An integrated wet-rotor zoning circulator for circulating fluid within a zone in a hydronic heating or cooling system. The zoning circulator has three primary components: a motor, an impeller casing, and a controller. The controller, which is integrated with the motor, houses a voltage transforming device (e.g., a transformer) and a switching device (e.g., a relay). When a thermostat in the zone being served by the zoning circulator closes, the switching device closes and the pump is activated.

15 Claims, 11 Drawing Sheets

INTEGRATED ZONING CIRCULATOR

BACKGROUND OF THE INVENTION

The invention relates generally to circulators for use in hydronic heating and cooling systems.

Such systems are often divided into zones, each zone serving a separate portion of a building and each zone controlled by its own thermostat. This allows a different temperature to be maintained in each area being heated or cooled. Zoning, i.e., diverting operating fluid into a given zone when necessary, is generally achieved using zone valves or circulators.

When zoning with circulators, a thermostatically-controlled pump is used to deliver operating fluid into each separate zone. As is most often found in the art today, a separate controller—containing a transformer and a relay—controls the circulator for each zone. The transformer steps line voltage (usually 115 volts) down, usually to 24 volts. A thermostat in the particular zone controls the relay, the coil of which operates at the stepped-down voltage. When the relay contacts close, line voltage is passed to the pump, thereby powering the circulator.

In some examples of the existing art, a controller consisting of one transformer and several relays—one relay for each zone—is utilized. A thermostat in each zone controls each relay, and each relay passes line voltage to the circulator in the given zone.

In each of these examples of the existing art, the circulator and controller are purchased and installed as independent parts. Electrical cabling is required between each controller and its associated circulator. Because the controller is separate from the circulator, it is usually manufactured to handle the largest possible circulator envisioned to be encountered. The transformer and relay usually have much greater electrical capability than necessary.

When zoning with circulators, it is also customary to install separate check valves on the outlet side of each circulator, both to isolate each zone from others and to prevent gravity circulation through the system. Gravity circulation occurs as the result of cooler, denser fluid in the return lines of a particular zone "falling," suctioning heated, less dense fluid into the given zone. The check valves are usually sweated into the supply line of each zone, downstream of the circulator.

Various forms of circulators are known. Some circulators employ a separate electrical motor coupled to a separate pump. Another form of circulator is the so-called "wet-rotor" circulator, in which the pump and motor are integrated, resulting in a more compact overall circulator unit. In a wet-rotor circulator, the rotor is supported within a rotor housing into which the fluid being circulated is allowed to enter (the fluid helps to lubricate the rotor bearings). The rotor housing is supported within a surrounding stator, which is sealed from the circulating fluid.

SUMMARY OF THE INVENTION

In general, the invention features an integrated wet-rotor zoning circulator for circulating fluid within a zone in a hydronic heating or cooling system. The zoning circulator has three primary components: a motor, an impeller casing, and a controller. The controller, which is integrated with the motor, houses a voltage transforming device (e.g., a transformer) and a switching device (e.g., a relay). When a thermostat in the zone being served by the zoning circulator closes, the switching device closes and the pump is activated. By integrating the controller into the circulator, substantial savings in installation cost are achieved. The labor associated with separate installation of the controller, and cabling between the controller and the circulator, are eliminated. Because the transformer, relay, and circulator motor are all pre-wired to each other, only two additional connections typically need to be made: a thermostat in the zone being controlled needs to be connected to the controller; and line voltage needs to be brought to the controller. With fewer parts and fewer electrical connections, the resulting installation is cleaner, and easier to maintain.

What would have seemed to be a disadvantage of the invention—that the controller is not separately replaceable as easily as with conventional separate controllers—has turned out not to be a problem, for the small savings that such easier separate replacement might provide during the life of an installation tend to be outweighed by the reduction in initial installation cost.

By integrating the controller with a wet-rotor circulator, the resulting integrated unit can be kept small enough to make installation practical. In preferred embodiments, the controller housing has no greater volume than approximately the volume of the motor housing of the circulator.

A very important further advantage of the invention is that it permits the transformer and relay of the controller to be matched in electrical capability to the circulator motor. The electrical overdesigning of these components, necessary when the controller is to be used with a variety of circulators, is avoided. This reduces the cost of the controller, and, just as importantly, reduces its size, making the integration of the controller and the circulator even more feasible.

In other preferred embodiments, the zoning circulator has a check valve integral with the casing to isolate one zone from another and to prevent gravity circulation. The zoning circulator has a ball valve integral with the casing to allow the pump to be serviced without draining the system. Integral valves greatly facilitate installation of the zoning circulator as only one integrated piece of hardware, needs to be installed.

In another aspect of the invention, a check valve is integrated into the impeller casing of a wet-rotor zoning circulator. Preferably, the check valve is spring biased so as to remain closed when subjected to gravity circulation, while allowing flow to pass when the pump is active. Furthermore, the check valve preferably has means to open it manually, so that gravity circulation can occur if it is so desired, as in a situation where the pump is inoperative.

These and other features and advantages of the invention will be apparent from the following description of presently preferred embodiments and from the claims.

DESCRIPTION OF THE PREFERRED EMBODIMENT

Figure 1:
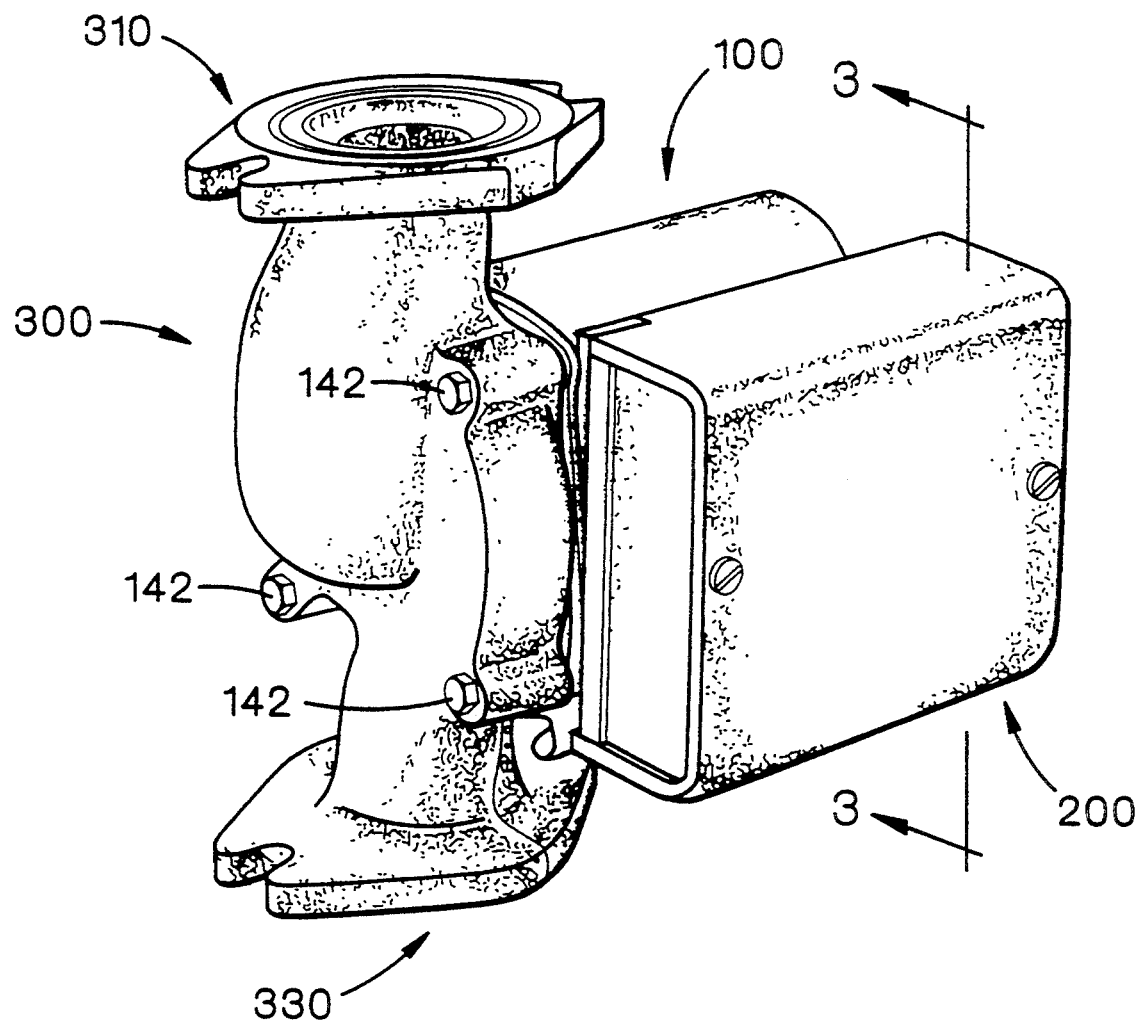
FIG. 1 shows a perspective view of the preferred embodiment of the zoning circulator.

As shown in FIG. 1, the zoning circulator comprises, generally, a motor 100, a controller 200, and an impeller casing 300, otherwise known as a volute.

Figure 2:
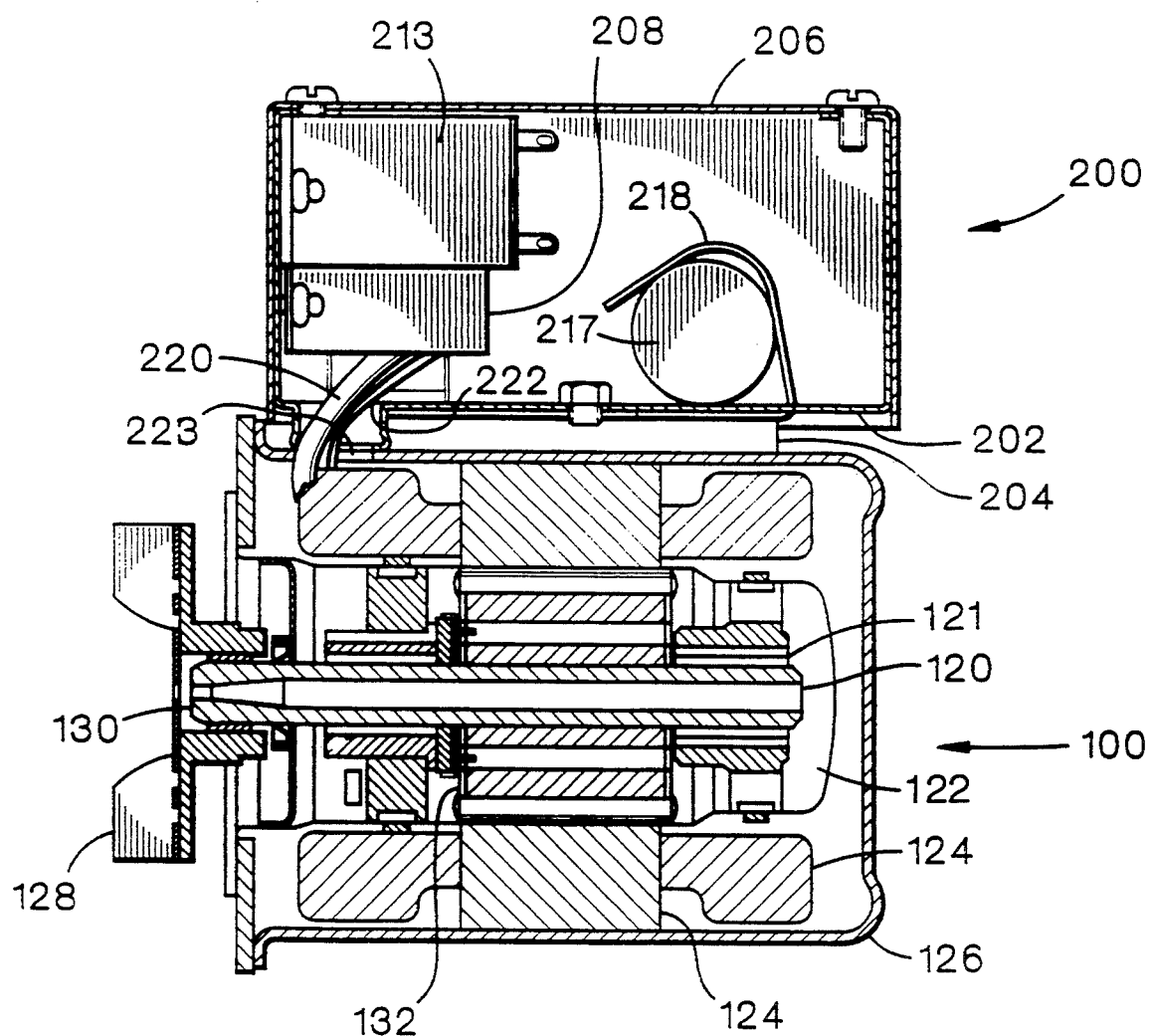
FIG. 2 shows a sectional plan view of the pump motor and controller of the zoning circulator, taken along 2—2 of FIG. 1, without showing the impeller casing.
Figure 3:
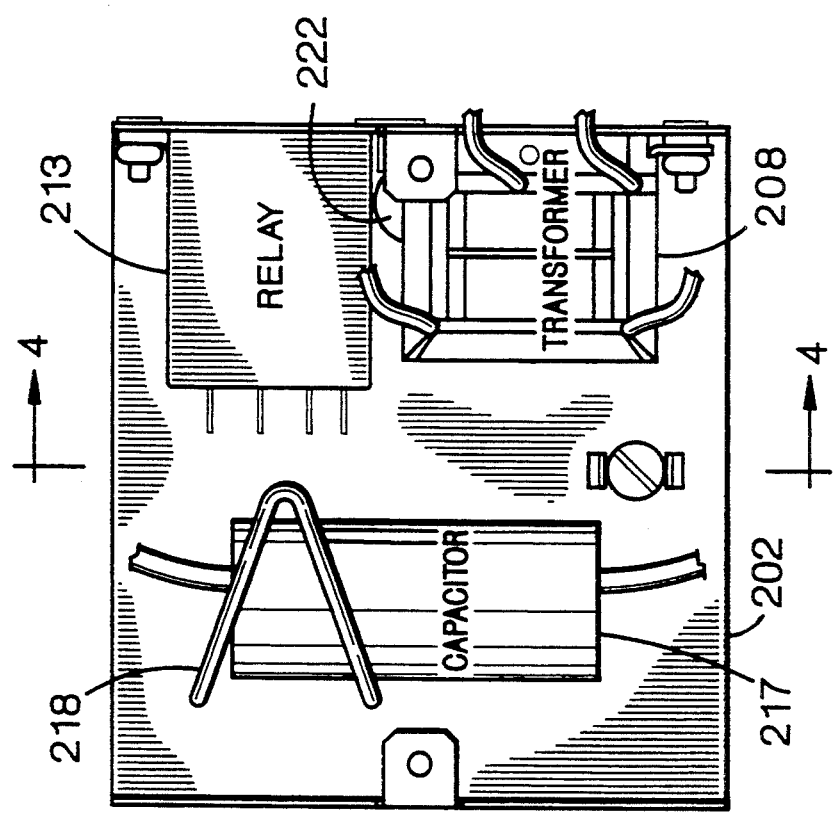
FIG. 3 shows a plan view of the controller with its cover removed taken along 3—3 of FIG. 1.
Figure 4:
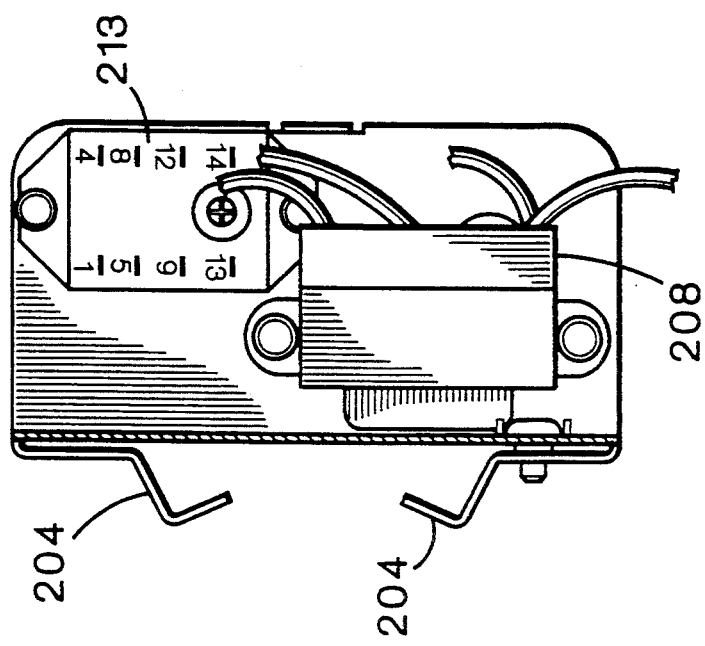
FIG. 4 shows a sectional end view of the controller of FIG. 3, taken along 4—4 of FIG. 3.

With reference to FIG. 2, the motor 100 is of the "wet-rotor" type, with a hollow shaft 120, water lubricated bearings 121 which is enclosed in a rotor housing 122, preferably a replaceable cartridge. The rotor housing 122 containing the rotor assembly is located in the center of the stator 124, which is contained within the motor housing 126. An impeller 128 mounted to one end 130 of the rotor shaft protrudes into the impeller casing 300 (see FIG. 8) and performs the pumping action. When the windings 124 are electrically excited, the magnetic field created interacts with the windings 132 of the rotor, causing rotor 132 and shaft 120 to rotate and hence the impeller 128.

Figure 5:
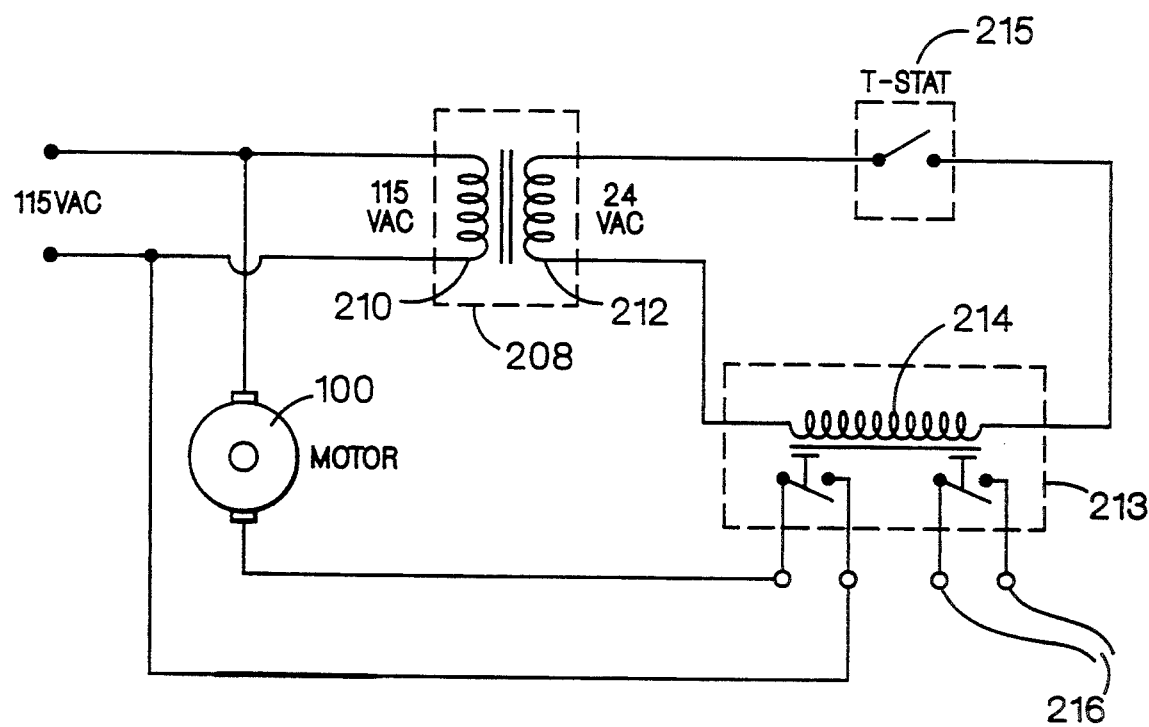
FIG. 5 shows schematically the primary electrical components of the preferred embodiment of the zoning circulator.

With reference to FIGS. 2, 3, 4, 5, 6 and 7, the controller 200 consists of a sheet metal housing 202 attached to the side of the motor housing 126 with a mounting bracket 204. A sheet metal cover 206 encloses the controller. The controller houses a 2.5 volt-amp, Underwriter's Laboratories class II rated transformer 208. (Class II transformers are inherently current limited by including such impedance within the transformer as to limit the current output to a desired maximum value; they also are sometimes provided with a thermostat or other temperature sensitive device to limit the maximum temperature of the transformer.) The transformer has a 115 volt primary coil 210, into which flows line voltage, and a 24 volt secondary coil 212 (FIG. 5). A relay 213 (5 amp-240 volt AC, 5 amp-28 volt DC) is also provided. The relay coil 214 runs on 24 volts. The relay 213 may be double pole, single throw if only the motor 100 is to be controlled by the relay; alternatively, the relay 213 may be double pole, double throw (as shown) if an additional device, such as a boiler, is to be controlled concurrently with the pump 100. Additional leads 216 from the relay 213 lead to such an additional device.

Transformer 208 and relay 213 have electrical capabilities matched to the motor 100. These components are not oversized electrically as is typical with prior art controllers, which are designed to work with a range of motor sizes. Thus, instead of the 40 volt-ampere power rating of the transformer in a typical prior art controller, transformer 208 has a 2.5 volt-ampere rating, which is approximately 20% greater than the expected power draw of relay 213. Similarly, instead of the 30 ampere current rating of the relay in a typical prior art controller, relay 213 has a 5 ampere current rating, which is approximately 25% greater than the expected maximum current draw of motor 100. In this sense the transformer is matched to the relay, and the relay is matched to the motor, i.e., their electrical ratings are not substantially greater (not more than 50% greater) than the expected peak electrical demands of the relay and motor, respectively. A small amount of overrating of the transformer and relay is necessary to account for manufacturing tolerances, and variations in loading under field conditions.

A thermostat 215 located in the building zone associated with the given zoning circulator is wired in series with the relay 213 and triggers the relay 213 when it closes.

Figure 6:
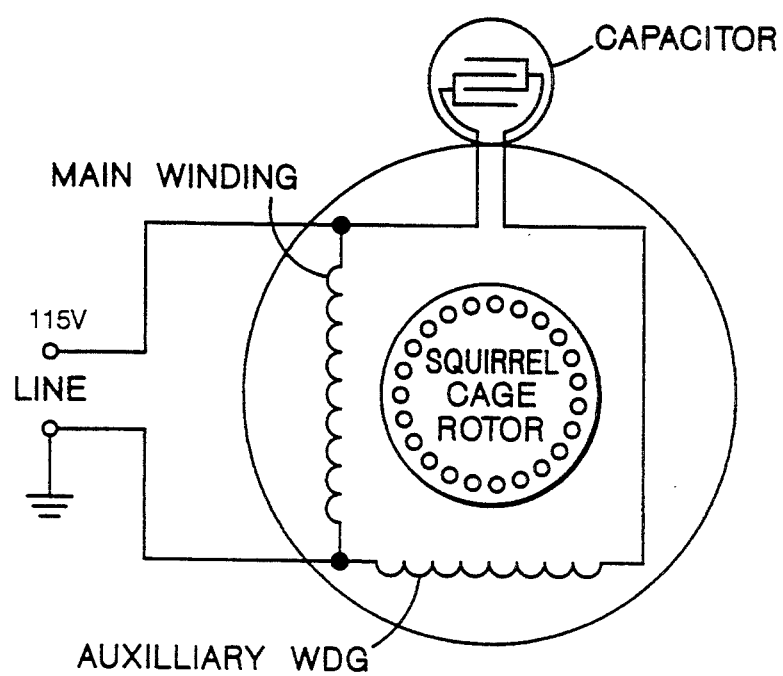
FIG. 6 shows schematically a permanent-split capacitor motor, the type of motor used in the preferred embodiment.
Figure 7:
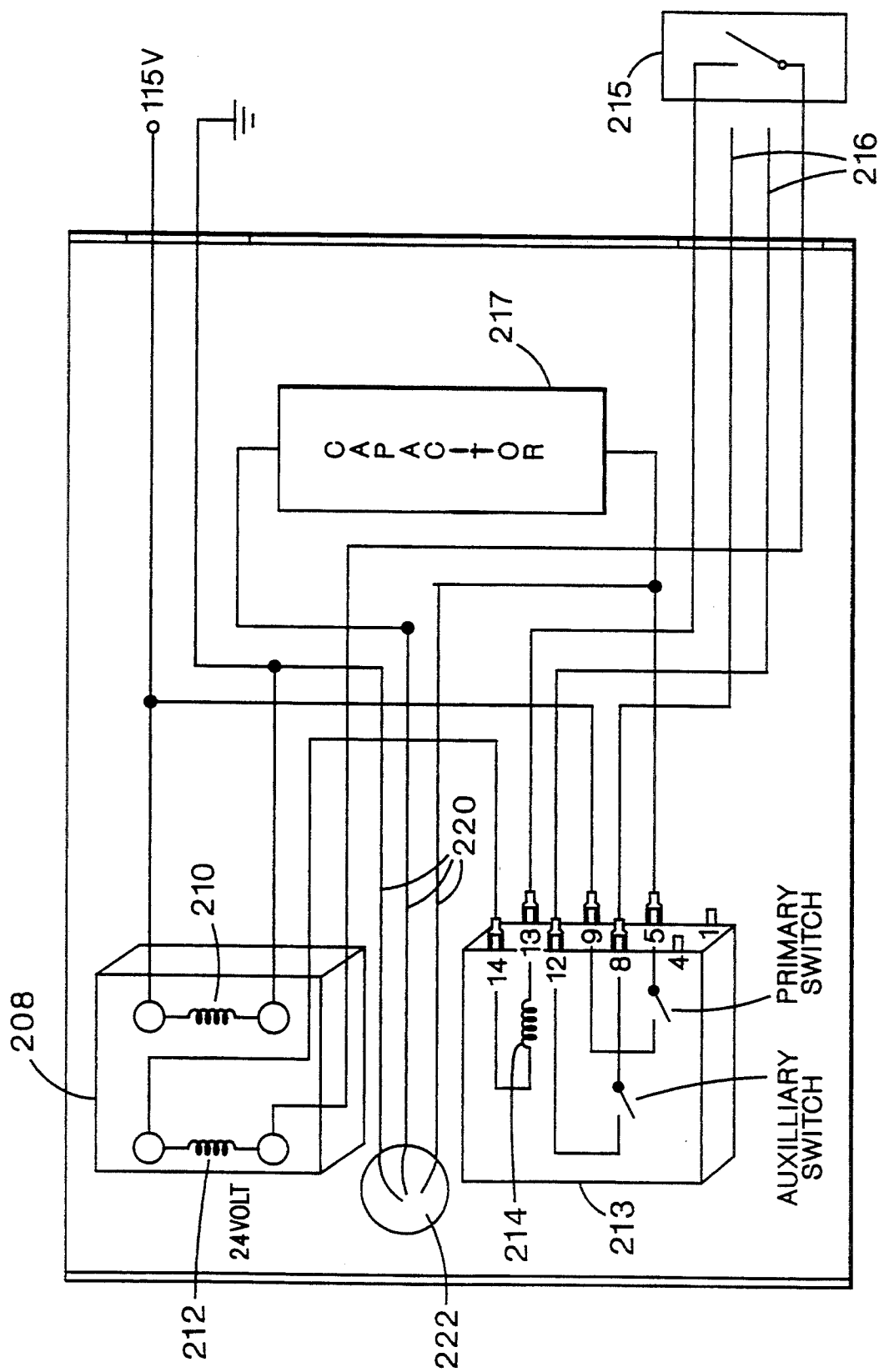
FIG. 7 shows a wiring diagram of the preferred embodiment of the zoning circulator.

A capacitor 217 (5 $\mu$F, 250 V) is also enclosed within the controller 200, as the motor 100 is preferably configured as a permanent-split capacitor motor (FIG. 6). A spring metal capacitor clip 218 secures the capacitor 217 within the controller housing 202.

Motor leads 220 pass to the stator windings 124 through a controller housing opening 222 and an opening 223 in the motor housing.

Figure 8:
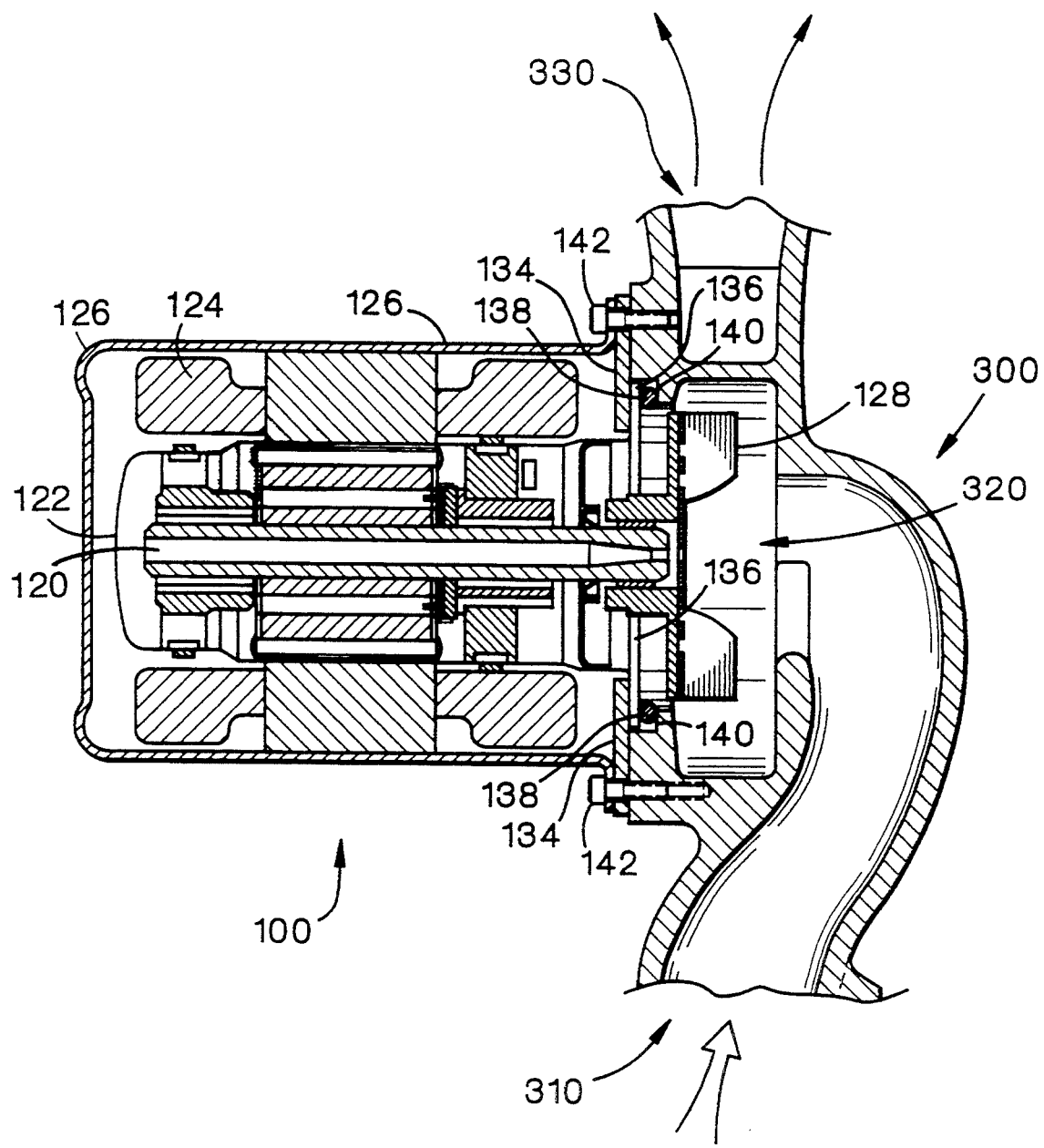
FIG. 8 shows a sectional view of the motor connected to the impeller casing, with most of the impeller casing broken away.
Figure 9:
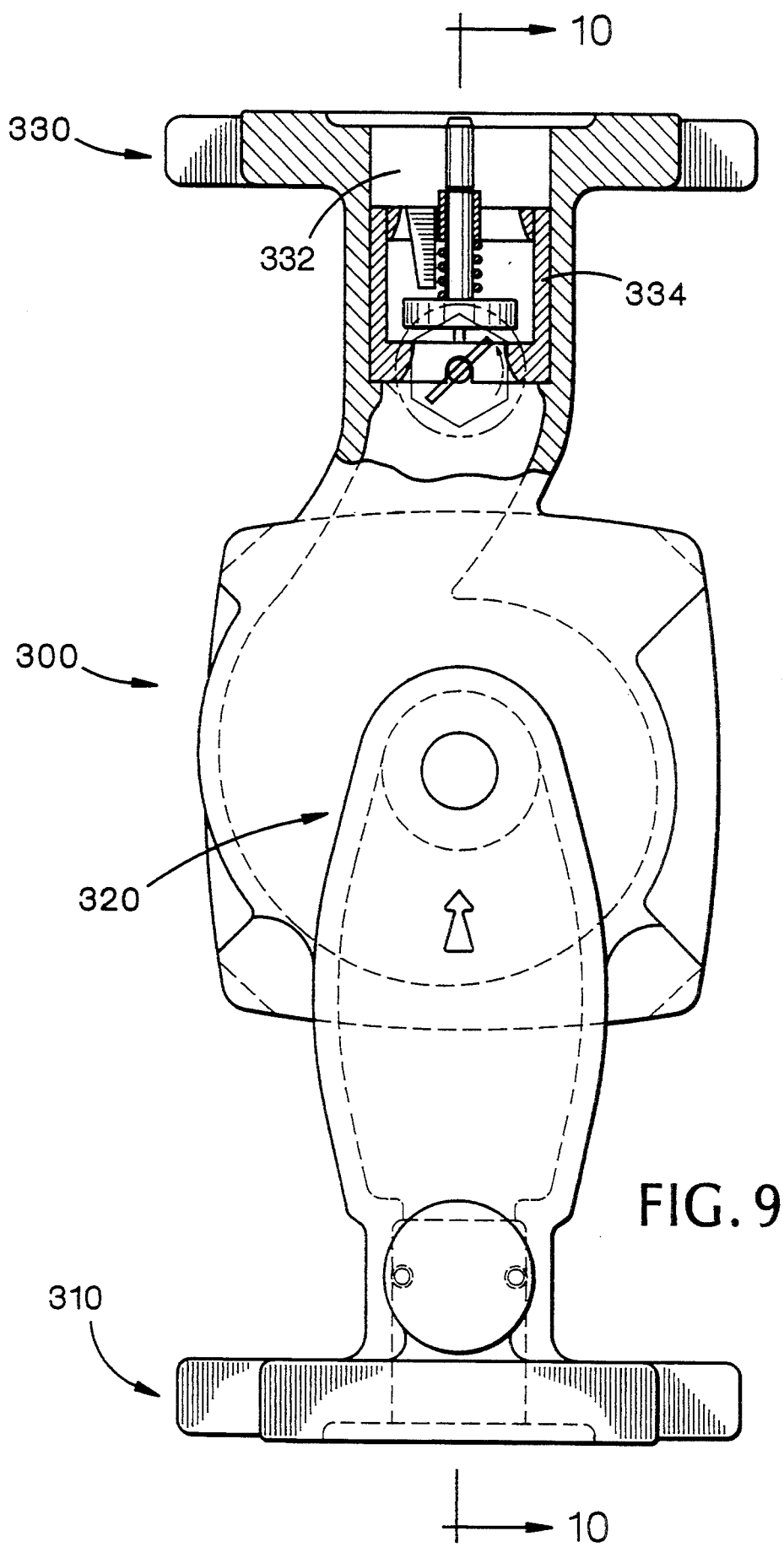
FIG. 9 shows an end view of an embodiment of the impeller casing of the zoning circulator having an integral check valve and an integral ball valve.

With reference now to FIG. 8, the motor housing 126 is enclosed by a cover plate 134 through which the cartridge 122 is inserted. A lip 136 on the cartridge 122 fits within a counterbore in the impeller casing 300. An O-ring 138 fits between the lip 136 and the shoulder 140 of the counterbore. Fluid is free to enter the rotor housing 122, as it is preferable to use a hollow shaft, water lubricated rotor. O-ring 138 prevents fluid from entering the motor housing 126, in which the stator windings are located. The motor 100 is bolted to the impeller casing 300 using attachment bolts 142, with the impeller 128 protruding into the impeller casing.

The impeller casing 300 is a casting of suitable material, most commonly iron or bronze. It includes an inlet end 310, an impeller zone 320, and an outlet end 330. When the motor is activated, fluid flows into the inlet end 310 and passes into the impeller zone 320. The fluid flows into the center of the impeller 128 and is spun outward, passing out of the impeller casing via the outlet end 330.

In operation, when thermostat 215 closes due to a temperature change in the area of the building being served by the zoning circulator, 24 volts from the secondary coil 212 of the transformer 208 is applied to the relay coil 214, causing the relay switches to close. Line voltage flows through one of the relay switches to the pump motor 100, activating the pump, which circulates fluid through the zone being served by the zoning circulator.

When the circulator for a given zone is not operating, it is important for the fluid line into the particular zone to be securely sealed off. Otherwise, fluid may circulate backwards through the zone due to back pressure from other zones; or forwards through the zone due to gravity circulation—the phenomenon where cooler, denser fluid in the return lines of the particular zone "falls," suctioning heated, less dense fluid into the given zone. In a preferred embodiment of the invention, an integral, replaceable check valve provides the necessary sealing.

Figure 10:
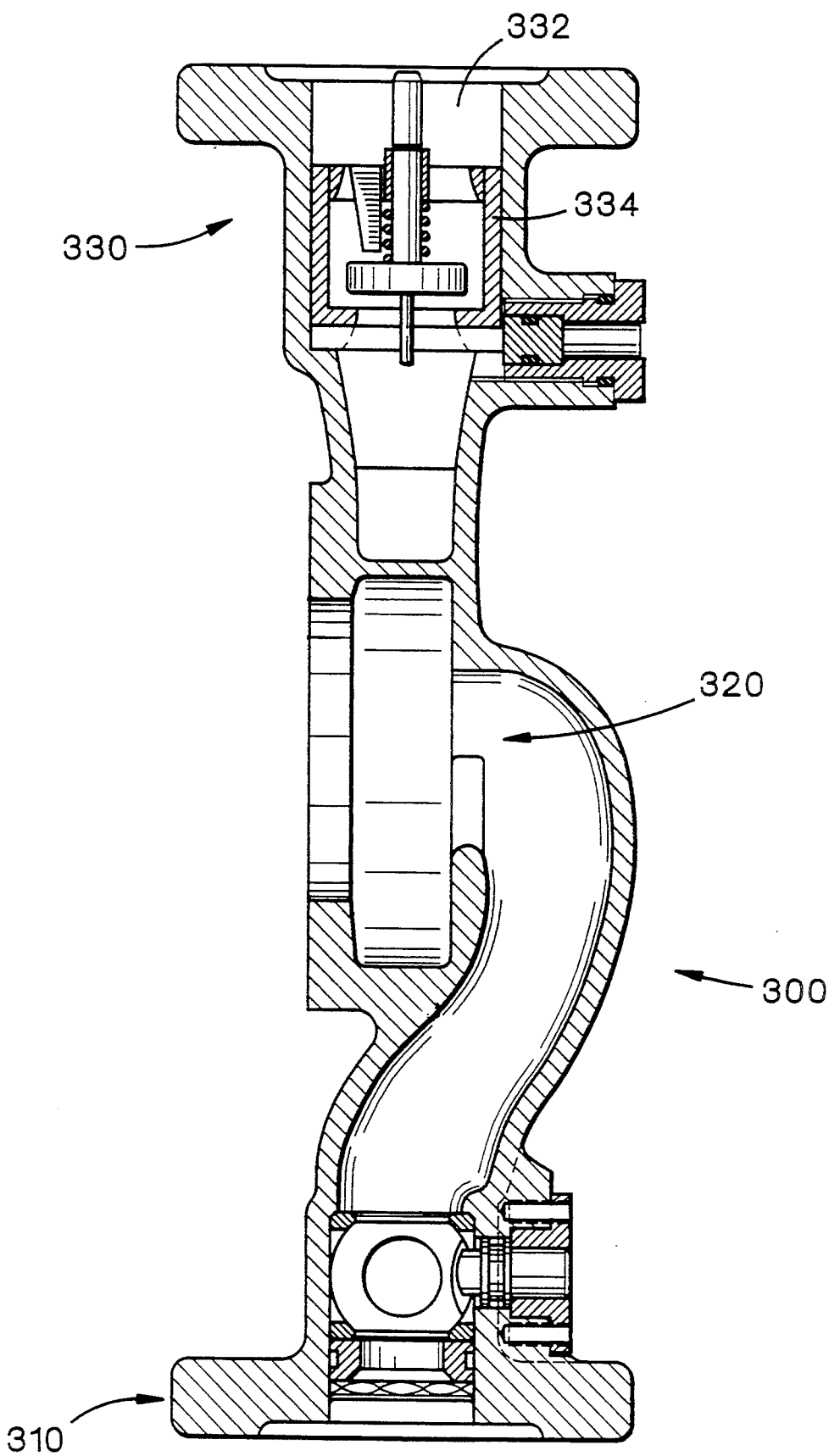
FIG. 10 shows a sectional view of the embodiment of the impeller casing taken along 10—10 of FIG. 8.
Figure 11:
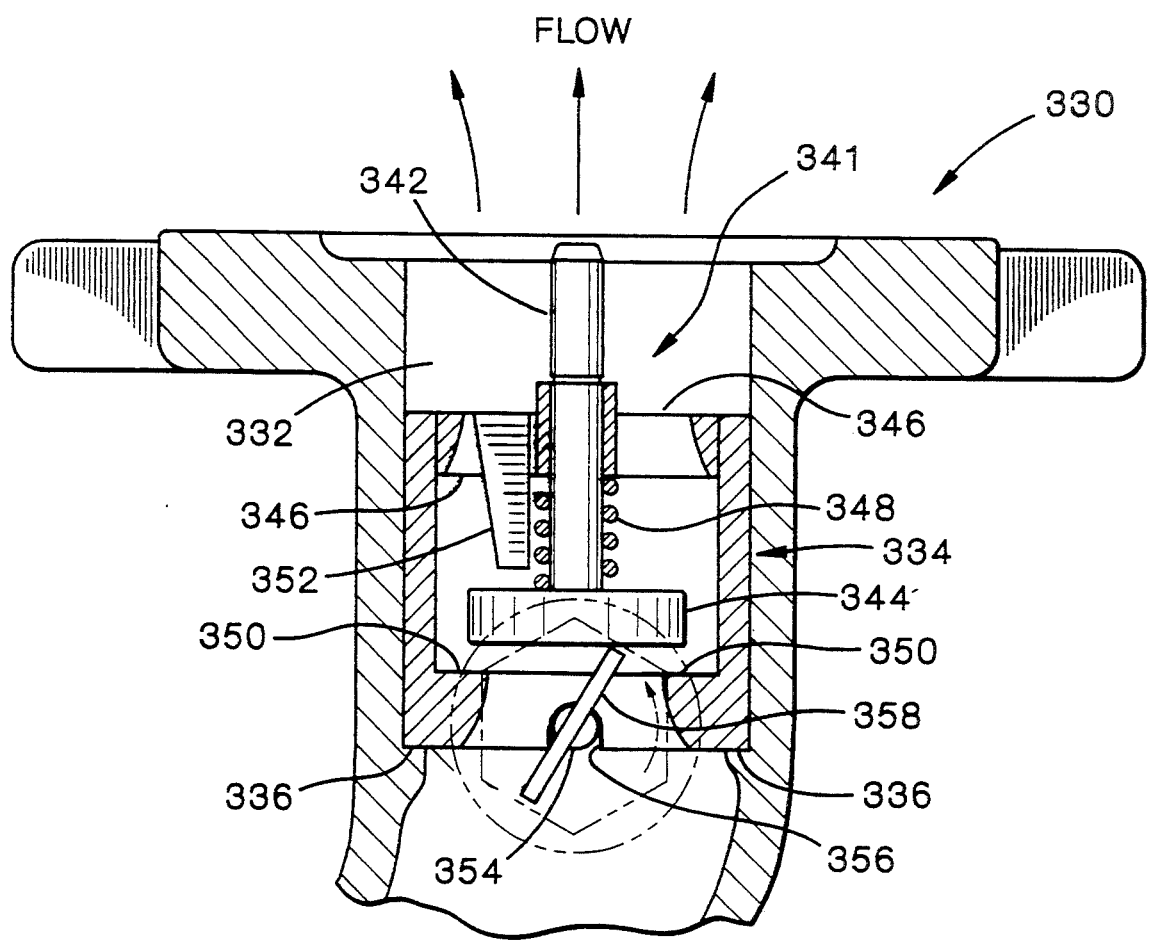
FIGS. 11 and 12 are enlarged views of the check valve end of the impeller casing shown in FIGS. 9 and 10, respectively, with the check valve shown partially open.
Figure 12:
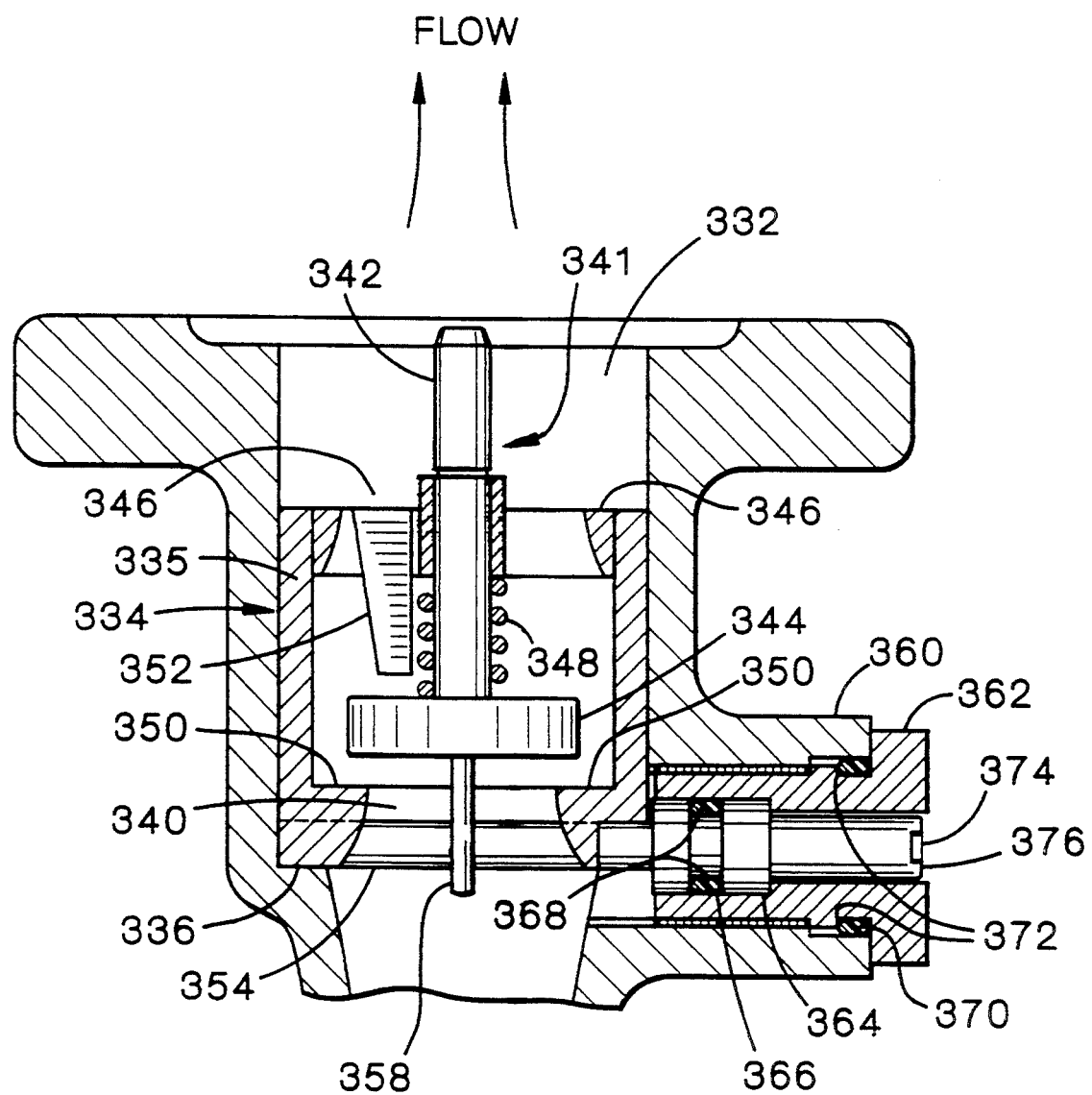

With reference to FIGS. 9, 10, 11, and 12, the outlet end 330 of such an embodiment has a check valve cavity 332 into which a removable check valve cartridge 334 is inserted. Referring to FIGS. 11 and 12, the check valve cartridge 334 includes a cylindrical cartridge housing 335, which abuts an annular shoulder 336 machined into the impeller casing 330.

The check valve 341 includes a stem 342 and a disc-shaped, rubber coated valve head 344. The stem 342 is supported by and slides within a spider bracket 346. The spider bracket 346 spans the top of the check valve cartridge 334 and allows fluid to pass through the assembly. A compression spring 348 disposed around the stem 342, and between the spider bracket 346 and the valve head 344, biases the check valve 341 against a valve seat 350 at the bottom of the check valve cartridge 334. It has been found in practice that gravity circulation can generate on the order of 0.5 psi of fluid pressure on the check valve in the opening direction. The compression spring 348 must be stiff enough to resist this pressure, but flexible enough to allow the check valve 341 to lift off the valve seat 350 when the pump 100 is active.

One or more fingerlike projections 352 act as stops which prevent overcompression of the compression spring 348.

The check valve assembly is further configured so as to be capable of manual opening. In the event the motor 100 is not functioning, it is possible to obtain nominal circulation due to gravity circulation by opening the check valve 341. An opening stem 354 traverses a flow passageway 340 and is rotatable within a pair of rounded notches 356 in the bottom of the check valve cartridge 334. A cam pin 358 projecting perpendicularly from the opening stem 354 lifts the valve head 344 from the valve seat 350 when the opening stem 354 is rotated.

The opening stem 354 extends outward through a stack 360 cast into the impeller casing 300. A threaded restraining collar 362 which surrounds the opening stem 354 is fastened to stack 360 via screw threads. The restraining collar 362 fits over an integral bushing 364 on the opening stem and restrains the opening stem 354 within the impeller casing 300. One O-ring 366 fits in an annular groove 368 around the bushing 364, and another O-ring 370 fits in an annular groove 372 around the exterior of the restraining collar 362. The O-rings 366, 370 prevent fluid from leaking from the impeller case 300 via the stack 360. A slot 374 in the exterior end 376 of the opening stem allows the check valve to be opened with an instrument such as a screwdriver.

Whereas the check valve assembly is located downstream with respect to the impeller zone, it is advantageous to have shut-off means located on the upstream side of the impeller zone. Without such additional shut-off means, the entire system would need to be drained before removing the motor 100 for servicing so as to avoid having the operating fluid rush out of the opened impeller casing 300. With an upstream shut-off, however, all that is spilled is the fluid in the casing 300 itself. In a preferred embodiment of the invention, an integral ball valve, located in the inlet end 310 of the impeller casing, provides the necessary upstream shut-off.

Figure 13:
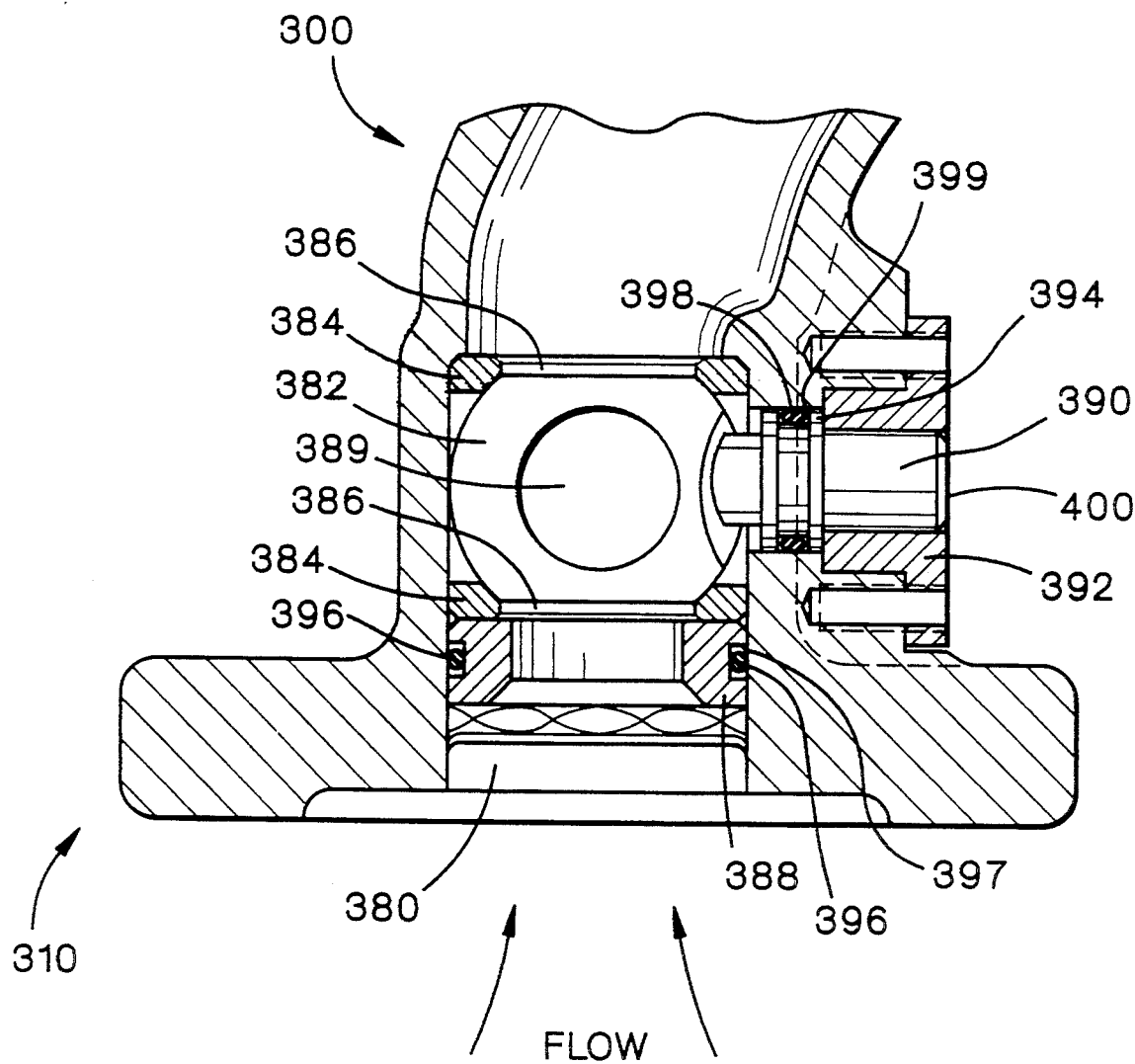
FIG. 13 is a enlarged view of the ball valve end of the impeller casing shown in FIG. 10, with the ball valve shown in the closed position.

With reference to FIGS. 10 and 13, the inlet end 310 has a ball valve cavity 380 in which a ball element 382 is located. The ball element 382 is secured within the cavity 380 by opposingly facing cup retainers 384 in which the ball element 382 is free to rotate. Flow passages 386 through the cup retainers, and a bore hole 389 through the ball element 382, allow fluid to flow into the impeller casing 300 when the ball valve is in the open position. A packing gland 388, with a flow passageway through it, secures the assembly within the ball valve cavity 380.

A stem 390 extends from the ball element 382 to the exterior of the impeller casing 300. A restraining collar 392 is bolted to the impeller casing 300 and abuts a bushing 394 which protrudes from the stem 390, thereby preventing translational movement of the ball element 382.

One O-ring 396 fits within an annular groove 397 in the packing gland 388; another O-ring 398 fits within an annular groove in the bushing 394. The O-rings 396, 398 prevent fluid from leaking past the ball element 382 or out of the impeller casing 300. A slot (not shown) in the exterior surface 400 of the stem 390 allows the ball valve to be opened or closed with an instrument such as a screwdriver.

Having thus described preferred embodiments of the invention, it will be appreciated that these and a great many other variations and embodiments of the invention are within the following claims. For example, the sheet-metal motor housing could be formed so as to have a compartment to serve as the controller housing, rather than as in the preferred embodiment wherein the two housings are made integral by affixing together separate housings. Also, the controller housing could be formed as separate compartments, e.g., one for each of the transformer, relay and capacitor. The check valve could be located at other locations within the impeller casing, and other check valve configurations could be used.

What is claimed is:

1. An integrated zoning circulator for circulating fluid within a hydronic heating or cooling system, the integrated zoning circulator comprising:
   a wet-rotor circulator motor, the circulator motor comprising
     a motor housing,
     a stator disposed within the motor housing and sealed from the circulating fluid,
     a rotor housing disposed within the motor housing within the stator, the rotor housing being unsealed from the circulating fluid so that the fluid enters the rotor housing,
     a rotor disposed within the rotor housing and in contact with the fluid, and
     an impeller affixed to one end of the rotor, the stator and rotor configured with respect to one another so that the rotor is caused to rotate when the stator is energized;
   an impeller casing fastened to the motor housing, the impeller casing comprising
     an inlet end for accepting the circulating fluid flowing into the impeller casing, the inlet end being configured for attachment to a pipe of the hydronic heating system,
     an impeller zone into which the impeller extends from the motor, the impeller zone being in fluid communication with the inlet of the impeller casing, and an outlet end for discharging the circulating fluid flowing from the impeller casing, the outlet end being configured for attachment to a pipe of the hydronic heating system;

a zoning circulator controller, the zoning circulator controller comprising a controller housing integral with the motor housing, electrical inlet ports in the controller housing for accepting low voltage thermostat leads and high voltage supply leads, a voltage transforming device disposed within the controller housing, the voltage transforming device being configured for transforming a high voltage delivered on the high voltage supply leads to a low voltage, an electrical switching device disposed within the controller housing, the electrical switching device having low voltage activation input terminals and at least one pair of high voltage switched output terminals, the switching device being configured to switch the output terminals when low voltage is supplied to the activation input terminals, low voltage conductors within the housing for connecting the low voltage thermostat leads to the low voltage output of the voltage transforming device and to the low voltage activation terminals of the electrical switching device, high voltage conductors within the housing for supplying the high voltage from the high voltage supply leads to at least one of the high voltage switched output terminals of the electrical switching device, and for connecting at least one other of the high voltage switched output terminals to the stator.

2. The integrated zoning circulator of claim 1 wherein the controller housing has a single internal chamber in which are located the voltage transforming device and the electrical switching device.

3. The integrated zoning circulator of claim 2 wherein the controller housing and motor housing are separate housings affixed to one another.

4. The integrated zoning circulator of claim 3 wherein an opening in the controller housing is approximately aligned with an opening in the motor housing, and wherein high voltage leads pass directly from the controller to the stator by passing through the aligned openings.

5. The integrated zoning circulator of claim 1 wherein the controller further comprises an electrical capacitor sized for use in starting the motor, and wherein the capacitor is connected between one of the switched high voltage output terminals of the electrical switching device and at least a portion of the stator.

6. The integrated zoning circulator of claim 1, wherein the electrical switching device is an electrical relay.

7. The integrated zoning circulator of claim 1, wherein the voltage transforming device is a transformer.

8. The integrated zoning circulator of claim 1 or 7 wherein said voltage transforming device has a power handling capacity matching that of the electrical switching device.

9. The integrated zoning circulator of claim 8 wherein said electrical switching device has a current handling capacity matching the current requirement of said circulator motor.

10. The integrated zoning circulator of claim 1 wherein the controller housing has about the same or less total volume as the motor housing.

11. The integrated zoning circulator of claim 7 wherein the transformer has an impedance selected so as to limit the current output to a preselected maximum value.

12. The integrated zoning circulator of claim 3 wherein the controller further comprises an electrical capacitor sized for use in starting the motor, and wherein the capacitor is connected between one of the switched high voltage output terminals of the electrical switching device and at least a portion of the stator;

wherein the electrical switching device is an electrical relay;

wherein the voltage transforming device is a transformer; and wherein the controller housing has about the same or less total volume as the motor housing.

13. The integrated zoning circulator of claim 1 or 12 wherein the outlet end of the impeller casing includes a check valve assembly configured to allow fluid to flow from the impeller zone, through the check valve assembly, and out through the outlet end; while preventing fluid from flowing in the reverse direction.

14. The integrated zoning circulator of claim 13 wherein included within said impeller casing there is a ball valve assembly configured to allow fluid to flow through the impeller casing when the ball valve assembly is in an open position and to which prevent fluid from flowing through the impeller casing when the ball valve assembly is in a closed position.

15. The integrated zoning circulator of claim 1 wherein the electrical switching device has a second pair of high voltage switched output terminals.

* * * * *